(12) United States Patent
Lu et al.

(10) Patent No.: US 12,058,734 B2
(45) Date of Patent: Aug. 6, 2024

(54) INFORMATION TRANSMISSION METHOD, APPARATUS, DEVICE AND STORAGE MEDIUM

(71) Applicant: GUANGDONG OPPO MOBILE TELECOMMUNICATIONS CORP., LTD., Guangdong (CN)

(72) Inventors: Qianxi Lu, Dongguan (CN); Zhenshan Zhao, Dongguan (CN); Yanan Lin, Dongguan (CN); Zuomin Wu, Dongguan (CN); Cong Shi, Dongguan (CN); Huei-Ming Lin, Melbourne (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 374 days.

(21) Appl. No.: 17/561,836

(22) Filed: Dec. 24, 2021

(65) Prior Publication Data
US 2022/0116995 A1    Apr. 14, 2022

Related U.S. Application Data

(63) Continuation of application No. PCT/CN2019/100091, filed on Aug. 9, 2019.

(51) Int. Cl.
*H04W 74/0808* (2024.01)
*H04W 72/04* (2023.01)

(52) U.S. Cl.
CPC ....... *H04W 74/0808* (2013.01); *H04W 72/04* (2013.01)

(58) Field of Classification Search
CPC .................................................. H04W 72/02
See application file for complete search history.

(56) References Cited

U.S. PATENT DOCUMENTS 11,690,044 B2 * 6/2023 Zhao ............... H04W 72/02
  370/329
11,723,068 B2 * 8/2023 Chae ............... H04W 72/04
  370/329

(Continued)

FOREIGN PATENT DOCUMENTS

CN    108347313 A    7/2018
CN    109219131 A    1/2019

(Continued)

OTHER PUBLICATIONS

International Search Report (ISR) dated May 7, 2020 for Application No. PCT/CN2019/100091.

(Continued)

*Primary Examiner* — Raj Jain
(74) *Attorney, Agent, or Firm* — Ladas & Parry, LLP

(57) ABSTRACT

An information transmission method, apparatus and device and a storage medium. The method comprises: performing channel sensing on a sidelink to determine whether the sidelink is available in a preset time period (61); when the sidelink is available in the preset time period, determining an available resource set of the sidelink in the preset time period (62); and sending data information in the preset time period by occupying a target resource in the available resource set (63). In the method, a terminal device determines an available resource set of the channel within a preset time period when a channel is idle, and sends data information on a target resource in the available resource set, so that the service quality of each system does not interfere with each other, and the systems stability is improved.

16 Claims, 7 Drawing Sheets

(56) References Cited

U.S. PATENT DOCUMENTS

2019/0053194 A1* 2/2019 Wei .................. H04W 72/20
2021/0212117 A1* 7/2021 Chae ................. H04W 72/02
2022/0116995 A1* 4/2022 Lu .................... H04W 72/04
2022/0201764 A1* 6/2022 Myung ............ H04W 74/0808

FOREIGN PATENT DOCUMENTS

| CN | 109565793 A | 4/2019 |
| CN | 109803431 A | 5/2019 |
| CN | 109842944 A | 6/2019 |
| WO | 2018133720 A1 | 7/2018 |
| WO | 2021026703 A1 | 2/2021 |

OTHER PUBLICATIONS

Written Opinion of the International Searching Authority for the international application No. PCT/CN2019/100091, mailed on May 7, 2020 with English translation provided by Google Translate.

* cited by examiner

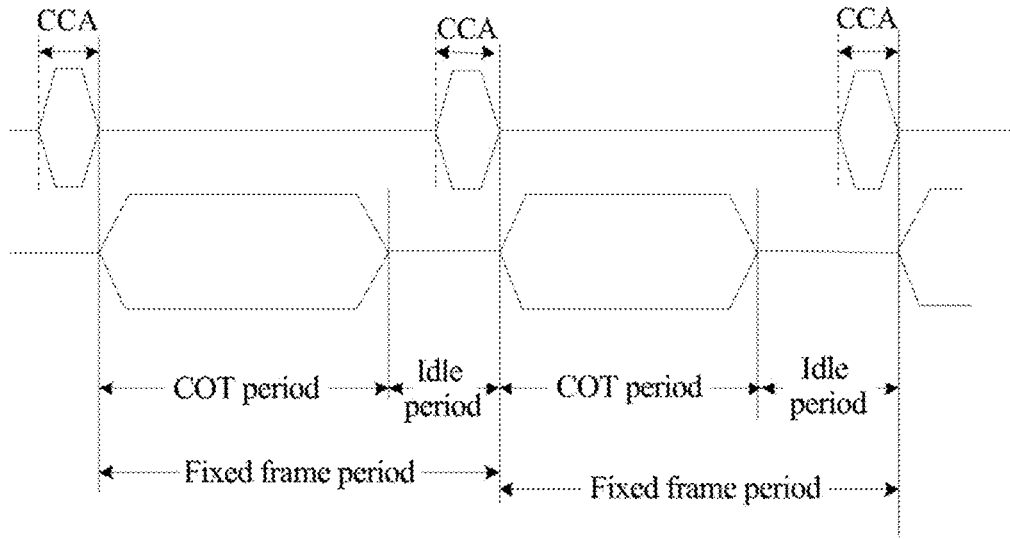

FIG. 5

```
┌─────────────────────────────────────────────────────┐
│ Perform channel sensing on a sidelink to determine whether │──  61
│    the sidelink is available in a preset time period       │
└─────────────────────────────────────────────────────┘
                          │
                          ▼
┌─────────────────────────────────────────────────────┐
│ Determine an available resource set of the sidelink in the │──  62
│   preset time period when the sidelink is available in the │
│                     preset time period                     │
└─────────────────────────────────────────────────────┘
                          │
                          ▼
┌─────────────────────────────────────────────────────┐
│  Send data information in the preset time period by occupying │──  63
│     a target resource in the available resource set       │
└─────────────────────────────────────────────────────┘
```

FIG. 6

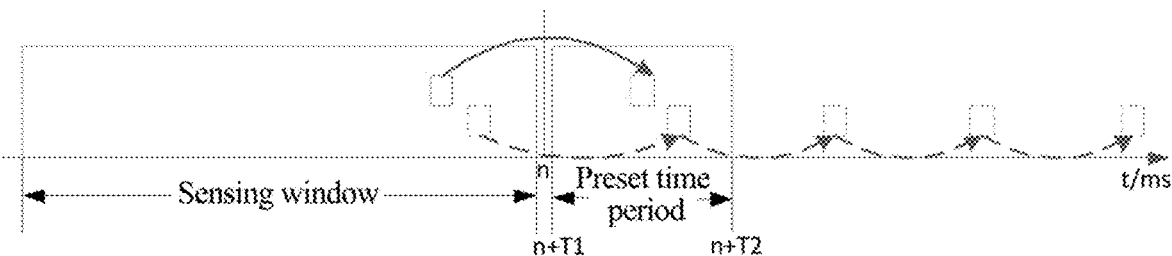

FIG. 7

INFORMATION TRANSMISSION METHOD, APPARATUS, DEVICE AND STORAGE MEDIUM

CROSS-REFERENCE TO RELATED APPLICATION

This application is a continuation of International Application No. PCT/CN2019/100091, filed on Aug. 9, 2019, which is hereby incorporated by reference in its entirety.

TECHNICAL FIELD

The present application relates to the field of communication, and in particular, to an information transmission method, apparatus and device and a storage medium.

BACKGROUND

A vehicle to everything system is a sidelink (SL) transmission technology based on device-to-device (D2D), which employs a device to device direct communication method, and thus has relatively high spectrum efficiency and low transmission delay.

In the prior art, in order to ensure fair coexistence between systems on an unlicensed spectrum, an energy detection mechanism (that is, a listen before talk (LBT) mechanism) is usually used. Specifically, before transmitting data on the unlicensed spectrum, a transmitting end needs to sense for a period of time in accordance with regulations. If a sensing result indicates that a channel is in an idle state, the transmitting end may transmit data to a receiving end. If the sensing result indicates that the channel is in an occupied state, the transmitting end needs to back off a certain period of time according to the regulations and then continue sensing until the sensing result of the channel is the idle state, and then, the transmitting end may transmit data to the receiving end.

However, although the energy detection mechanism can ensure fair coexistence between systems on the unlicensed spectrum, the service quality of each system cannot be guaranteed when the communication system is under high load, and there is a problem of low communication performance.

SUMMARY

Embodiments of the present application provides an information transmission method, apparatus and device, and a storage medium, to solve the problem that the service quality of each system cannot be guaranteed, resulting in low communication performance.

In a first aspect, an embodiment of the present application provides an information transmission method, applied to a terminal device, the method including:
performing channel sensing on a sidelink to determine whether the sidelink is available in a preset time period;
determining an available resource set of the sidelink in the preset time period when the sidelink is available in the preset time period; and
sending data information in the preset time period by occupying a target resource in the available resource set.

In a second aspect, an embodiment of the present application provides n information transmission apparatus, applied to a terminal device, wherein the apparatus includes: a sensing module, a processing module, and a sending module;
the sensing module is configured to perform channel sensing on a sidelink to determine whether the sidelink is available in a preset time period;
the processing module is configured to determine an available resource set of the sidelink in the preset time period when the sidelink is available in the preset time period; and
the sending module is configured to send data information in the preset time period by occupying a target resource in the available resource set.

In a third aspect, an embodiment of the present application provides a terminal device, including:
a processor, a memory, a communication interface and a system bus;
the memory stores computer-executable instructions;
the processor executes the computer-executable instructions stored in the memory to cause the processor to execute the method according to the first aspect.
Optionally, the processor may be a chip.

In a fourth aspect, an embodiment of the present application provides a computer-readable storage medium, where the computer-readable storage medium has computer-executable instructions stored thereon, and when the computer-executable instructions are executed by a processor, the method according the first aspect is implemented.

In a fifth aspect, an embodiment of the present application provides a program, and when the program is executed by a processor, the method according the first aspect is executed.

In a sixth aspect, an embodiment of the present application provides a computer program product, including: program instructions, and the program instructions are used to implement the method according the first aspect.

In a seventh aspect, an embodiment of the present application provides a chip, including: a processing module and a communication interface, and the processing module can execute the method according the first aspect.

Further, the chip also includes a storage module (for example, a memory), the storage module is used to store instructions, the processing module is used to execute the instructions stored in the storage module, and the execution of the instructions stored in the storage module causes the processing module to execute the method according the first aspect.

In an eighth aspect, an embodiment of the present application provides a communication system, including: a first terminal and a second terminal;
the first terminal device is the apparatus according to the second aspect or the terminal device according to the third aspect, and the first terminal device and the second terminal device communicate with each other;
optionally, the communication system may further include: a network device, and the network device is used to provide a service to the first terminal device and/or the second terminal device.

The embodiments of the present application provide an information transmission method, apparatus, and device, and a storage medium. In NR-V2X, a terminal device performs channel sensing on a sidelink to determine whether the sidelink is available in a preset time period, determines an available resource set of the sidelink in the preset time period when the sidelink is available in the preset time period, and sends data information in the preset time period by occupying a target resource in the available resource set. That is, the terminal device determines the available resource set of the channel in the preset time period when the channel is idle, and sends the data information on the target resource in the available resource set, so that the service quality of each system does not interfere with each other, and system stability is improved.

BRIEF DESCRIPTION OF DRAWINGS

FIG. 5 is a schematic diagram of a frame structure in an FBE-based channel access method;

FIG. 6 is a schematic flowchart of a first embodiment of an information transmission method provided by an embodiment of the present application;

FIG. 7 is a schematic diagram of distribution of a first time period and a preset time period corresponding to a sidelink;

DESCRIPTION OF EMBODIMENTS

Figure 1:
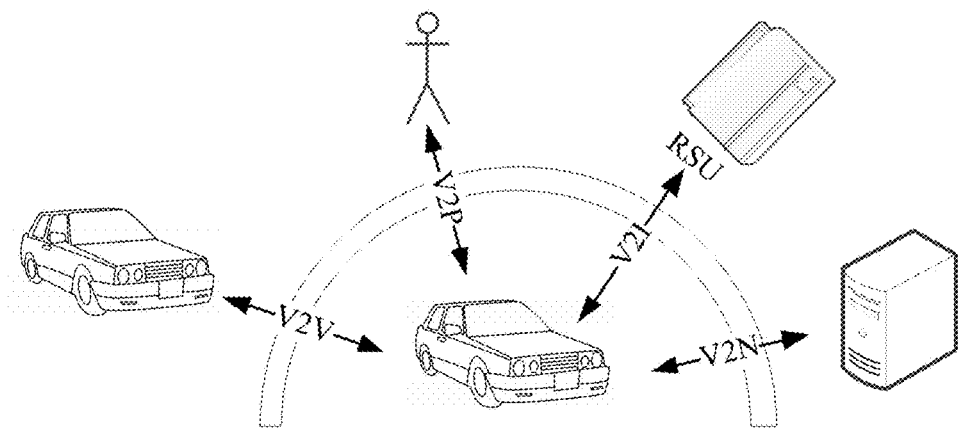
FIG. 1 is a schematic diagram of architecture of V2X communication.

In order to make the purpose, technical solutions and advantages of the embodiments of the present application clearer, the technical solutions in the embodiments of the present application will be described clearly and completely in conjunction with the drawings in the embodiments of the present application. Obviously, the described embodiments are part of the embodiments of the present application, but not all of the embodiments. Based on the embodiments in the present application, all other embodiments obtained by the skilled in the art without creative work fall within the protection scope of the present application.

The terms "first", "second", etc. in the description, claims, and the drawings of the embodiments of the present application are used to distinguish similar objects, and are not used to describe a specific order or sequence. It should be understood that the data used herein may be interchanged under appropriate situations, so that the embodiments of the present application may be implemented in a sequence other than that shown or described herein. In addition, the terms "including" and "having" and any variations of them are intended to cover non-exclusive inclusions. For example, a series of steps or units included in a process, a method, a system, a product, or a device are not necessarily limited to the steps or units which are clearly listed, but may include other steps or units which are not clearly listed or are inherent to the process, the method, the product, or the device.

With the development of the network technology and the intelligent vehicle technology, vehicle to everything has attracted more and more attention. An vehicle to everything system is a sidelink transmission technology based on D2D. Unlike a traditional LTE system in which communication data is received or sent through a base station, the vehicle to everything system employs device-to-device direct communication, and thus has higher spectrum efficiency and lower transmission delay.

In the 3rd generation partnership project (3GPP), D2D is divided into different stages for research as follows.

Proximity based services (ProSe): mainly used to improve spectrum utilization and reduce base station load. Specifically, terminals communicate directly through spectrum resources allocated by a base station, thereby improving the utilization of radio spectrum resources. After proximity based services between terminals are successfully established, device-to-device communication can be performed, and the load of the base station can be reduced, which is mainly for public security service. Optionally, resource selection may be performed through an equal-probability random selection method in ProSe, which will not be described in detail here.

Vehicle to everything (V2X): research on vehicle to everything systems focuses on a scenario of vehicle-to-vehicle communication, and it is mainly oriented to communication services of vehicle-to-vehicle, vehicle-to-pedestrian, which move at a relatively high speed.

Wearable devices (FeD2D): mainly used in a scenario where a wearable device accesses a network through a mobile terminal, which is mainly oriented to a scenario with low moving speed and low power access.

The following briefly introduces a schematic diagram of architecture of V2X communication.

At present, in a vehicle to everything communication system, a vehicle to everything terminal implements interaction of intelligent information between a vehicle and X (vehicle, people, traffic roadside infrastructure and network) through vehicle-to-everything (V2X) technology. Interaction modes of V2X communication include: vehicle to vehicle (V2V), vehicle to roadside infrastructure (V2I), vehicle to pedestrian (V2P), vehicle to network (V2N). Illustratively, the roadside infrastructure may be a road side unit (RSU).

FIG. 1 is a schematic diagram of the architecture of V2X communication. As shown in FIG. 1, the V2X communication includes V2V communication, V2P communication and V2N communication. In the V2X communication, a V2X service is transmitted via a sidelink or a Uu port.

In practical applications, V2X implements typical application scenarios such as information services, traffic safety, and traffic efficiency with the help of all-round connections and efficient information interaction among people, vehicles, roads, and cloud platforms. A vehicle to everything terminal may acquire various information services including traffic signal information, vehicle information in nearby areas, vehicle navigation, emergency rescue, and infotainment services through V2I and V2N communication. The information such as speed, location, driving situation of surrounding vehicles and pedestrian activities may be acquired in real time through V2V and V2P communication, and a collision warning function may be implemented through an intelligent algorithm to avoid traffic accidents.

Functions such as vehicle speed guidance may be implemented through V2I communication to improve traffic efficiency.

With the continuous development of technology, a new radio (NR) communication system is currently introduced. V2X in an NR system is called NR-V2X. The following will explain application scenarios of NR-V2X.

In an NR-V2X system, automatic driving needs to be supported, and thus, higher requirements are put forward for data interaction between on-board terminals, such as higher throughput, lower delay, higher reliability, larger coverage, and more flexible resource allocation, etc.

In the NR-V2X system, communication through a sidelink is called a V2X sidelink communication mode. In this communication mode, an on-board terminal may operate in a scenario with or without network coverage.

In the scenario with network coverage, the V2X sidelink communication mode is further divided into a centralized scheduling transmission mode and a distributed transmission mode.

In the centralized scheduling transmission mode, a transmission resource for a terminal device to transmit a V2X service on a sidelink is allocated by a network device, which is called mode 1 in the NR-V2X system. In the distributed transmission mode, a network device configures a V2X sidelink resource pool, and each time a terminal device transmits a V2X service, it acquires a resource from the resource pool configured by the network without scheduling of the network device. This mode is called mode 2 in the NR-V2X system. Refer to the description of the schematic diagrams shown in FIG. 2 and FIG. 3 for details.

It is worth noting that the terminal device may also be in a mixed mode, that is, the terminal device can obtain a resource through mode 1, and may also obtain a resource through mode 2. The embodiments of the present application do not limit the communication mode for the terminal device to obtain a resource, which can be determined according to actual conditions.

Figure 2:
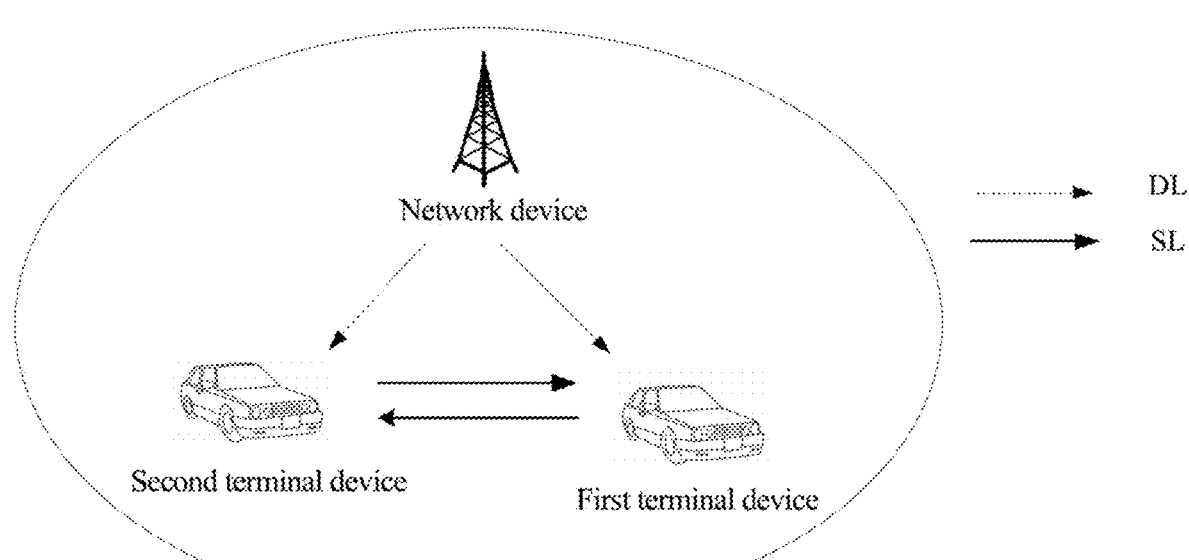
FIG. 2 is a schematic diagram of system architecture where mode 1 is applicable.
Figure 3:
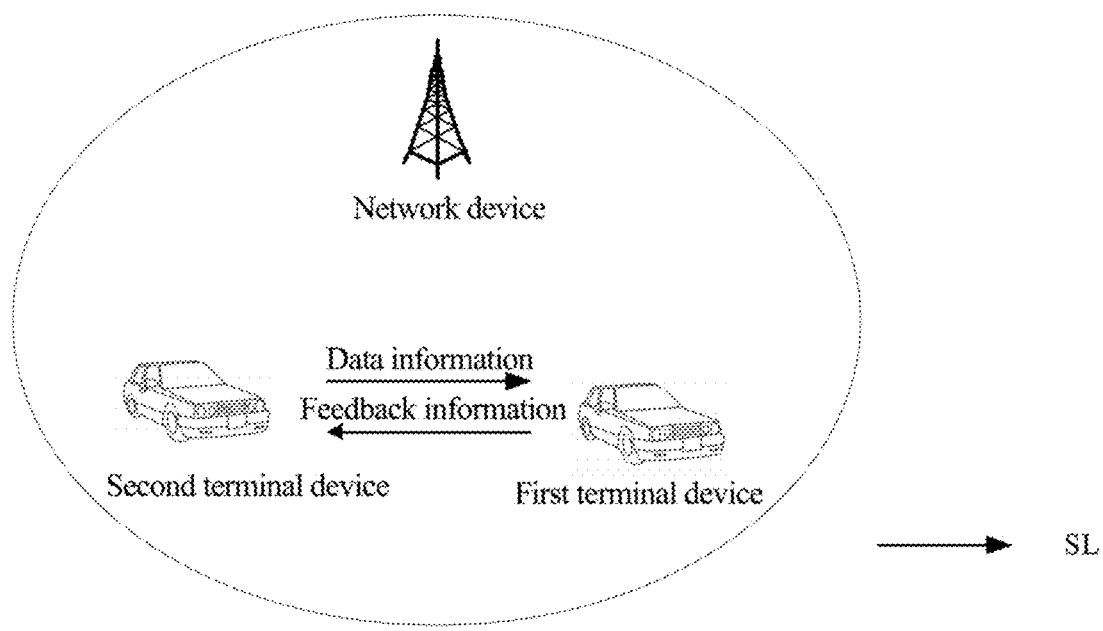
FIG. 3 is a schematic diagram of system architecture where mode 2 is applicable.

FIG. 2 is a schematic diagram of system architecture where mode 1 is applicable. FIG. 3 is a schematic diagram of system architecture where mode 2 is applicable. As shown in FIG. 2 and FIG. 3, the first terminal device and the second terminal device are terminal devices with V2X communication capability, which are configured to perform V2X communication. The first terminal device and the second terminal device perform V2X communication through a wireless communication interface. The first terminal device and the network device, or the second terminal device and the network device perform communication through a wireless communication interface. For clarity, the wireless communication interface between the first terminal device and the second terminal device is referred to as a first air interface, where the first air interface is, for example, a sidelink. The wireless communication interface between the first terminal device and the network device or between the second terminal device and the network device is called a second air interface, where the second air interface is, for example, a Uu interface.

Referring to FIG. 2, as an example, the transmission resources of the first terminal device and the second terminal device are allocated by the network device, the first terminal device performs data transmission with the second terminal device on the sidelink according to a resource allocated by the network device. The network device may allocate a resource for a single transmission to the first terminal device and the second terminal device, or allocate a semi-static transmission resource to the first terminal device and the second terminal device, which will not be detailed here.

Referring to FIG. 3, as another example, the first terminal device and the second terminal device may select a resource in a resource pool to perform data transmission. Specifically, the first terminal device and the second terminal device may select a transmission resource from the resource pool by sensing, or select a transmission resource from the resource pool by random selecting. Regarding the method through which the first terminal device and the second terminal device select the transmission resource, it can be determined according to actual situations, which will not be repeated here.

In a scenario without network coverage, terminal devices use the above-mentioned mode 2 for transmission. At this time, the resource pool is acquired through a pre-configuration method. The specific transmission method is the same as the above-mentioned mode 2, which will not be repeated here.

Furthermore, in order to improve transmission reliability in NR-V2X, a feedback channel is introduced to the sidelink. As shown in FIG. 2 and FIG. 3, the first terminal device (for example, UE1) and the second terminal device (for example, UE2) constitute a unicast link, UE1 sends sidelink data to UE2, and UE2 sends feedback information to UE1 according to a detection result of received sidelink data. Illustratively, the feedback information may be hybrid automatic repeat request acknowledgement (HARQ ACK) or HARQ non-acknowledgement (HARQ NACK).

UE1 decides whether to retransmit the data sent to UE2 according to the received feedback information of UE2.

It is worth noting that the feedback information between terminal devices is also applicable to groupcast communication. In a communication group, when a terminal sends groupcast information, other terminals in the group send feedback information to the sending end according to status of received data.

Illustratively, for the groupcast communication method, content of the feedback information may include the following two manners: only the HARQ NACK is fed back, and the HARQ ACK or HARQ NACK is fed back. The specific analysis is as follows.

Manner 1: Only HARQ NACK is fed back. That is, only when the receiving terminal (for example, UE2 to UE4) is within a certain distance from the sending terminal (for example, UE1), and does not receive a physical sidelink shared channel (PSSCH) correctly, then the receiving terminal that needs to feed back HARQ NACK sends feedback information. Further, all receiving terminals that need to send HARQ NACK use the same transmission resource to send feedback information.

Manner 2: HARQ ACK or HARQ NACK is fed back. The receiving terminal in the communication group sends HARQ ACK if receiving a PSSCH correctly, and sends HARQ NACK if not receiving a PSSCH correctly. Further, different receiving terminals use different transmission resources to send feedback information, where the different transmission resources include different time domain resources, frequency domain resources or code domain resources.

Figure 4:
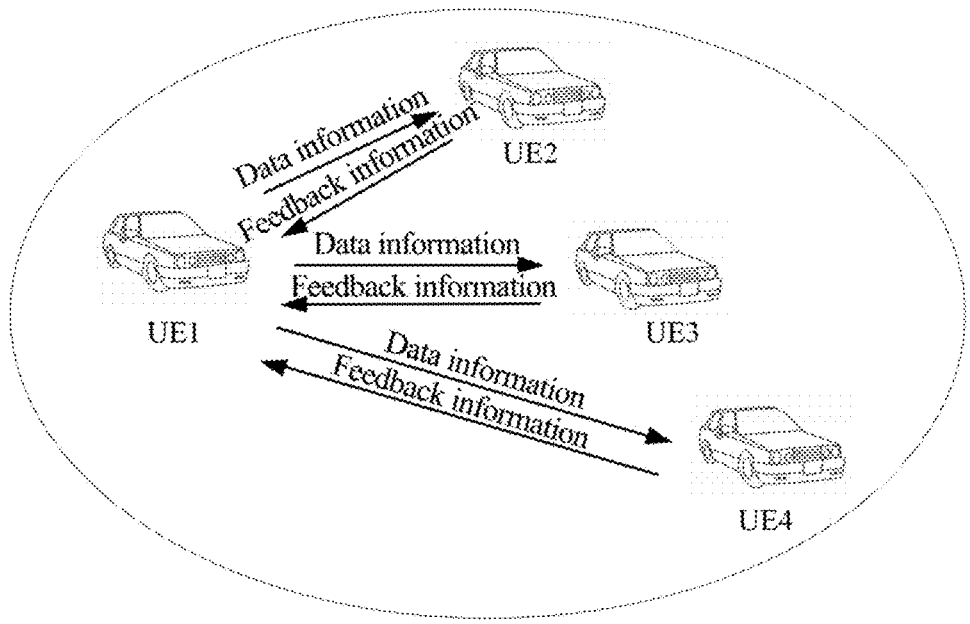
FIG. 4 is a schematic diagram of information transmission between terminal devices in a communication group.

Illustratively, FIG. 4 is a schematic diagram of information transmission between terminal devices in a communication group. As shown in FIG. 4, the communication group includes 4 terminal devices (UE1 to UE4). When UE1 sends sidelink data, UE2, UE3, and UE4 are data receiving ends and send feedback information to the sending UE1 according to whether the data is received correctly.

The embodiments of the present application do not limit the resource selection mechanism for a terminal device to send feedback information, and it can be limited according to actual situations.

The above introduces the V2X communication architecture and NR-V2X application scenarios in the embodiments of this application. The following introduces the relevant background of the unlicensed spectrum and a new radio based access to unlicensed spectrum (NR-U) system.

A radio frequency spectrum is a carrier for propagating a mobile communication signal, which is a limited, non-renewable natural resource and a precious strategic resource of a country. Therefore, various countries have special management agencies for the radio frequency spectrum and issue special policies and regulations to realize unified planning and management of the radio frequency spectrum. At present, most of countries employ fixed spectrum allocation strategies to manage the spectrum, that is, spectrum resources are managed by government authorities and allocated to fixed authorized users, which can ensure that excessive mutual interference between users is avoided and make better use of spectrum resources. Currently, spectrum resources can be divided into two categories: licensed spectrum and unlicensed spectrum.

The licensed spectrum is strictly restricted and protected, and only authorized users and their devices that meet specifications are allowed to access, and users need to pay for this. At present, important departments such as public security, railway, civil aviation, radio and television, and telecommunications all have certain licensed spectrums. The communications of devices in these departments are running on their licensed spectrums, especially in the telecommunications industry. Terminal devices such as mobile phones communicate through the licensed spectrum owned by an operator. The three major operators all have dedicated frequency bands authorized by the National Radio Administration to protect the public mobile communications from interference.

Unlicensed spectrum is a spectrum allocated by countries and regions that can be used for radio device communication. The spectrum is usually considered to be a shared spectrum, that is, communication devices in different communication systems may access and use the spectrum as long as they meet the regulatory requirements set by the countries or regions on the spectrum, and there is no need to apply for dedicated spectrum authorization from the government. For example, WiFi and Bluetooth frequently used in daily life are all transmitted through unlicensed spectrums.

In a 3GPP project, unlicensed operation modes are specified for NR, and the objective is to make NR operate in unlicensed frequency bands. Specifically, an NR-U system may include the following operation scenarios.

Scenario A: in an operation scenario of carrier aggregation, a primary cell (Pcell) operates on a licensed spectrum, and a secondary cell (Scell) performs aggregated operation on an unlicensed spectrum through carrier aggregation.

In this operation scenario, a UE may communicate with a base station through multiple component carriers at the same time after entering a connected state. The base station will designate a primary component carrier (PCC) for the UE through explicit configuration or according to an agreement. Other component carriers are called a secondary component carrier (SCC). The serving cell on the primary component carrier (PCC) is called a primary serving cell (Pcell), and the serving cell on the secondary component carrier (SCC) is called a secondary service cell (Scell).

Scenario B: an operation scenario of LTE and NR dual connectivity, that is, when a terminal device operates in the LTE and NR dual connectivity scenario, the primary serving cell PCell of the terminal device may be an LTE licensed spectrum, and the secondary serving cell PScell of the terminal device may be an NR unlicensed spectrum. Cooperative operation between the LTE and NR systems may be implemented through the dual connectivity technology, facilitating increase of a user rate and reduction of handover delay.

Scenario C: a standalone operation scenario, where an NR system operates on an unlicensed spectrum as a standalone cell.

Scenario D: an NR single-cell scenario, where uplink (UL) transmission of a terminal device operates on a licensed spectrum, and downlink (DL) operates on an unlicensed spectrum.

Scenario E: in an operation scenario of LTE and NR dual connectivity, the primary serving cell PCell of the terminal device may be an NR licensed spectrum, and the secondary serving cell PScell may be an NR unlicensed spectrum.

Generally, operating bands (Bands) of NR-U include a 5 GHz unlicensed spectrum and a 6 GHz unlicensed spectrum. On the unlicensed spectrum, the design of NR-U should ensure fairness with other systems that are already operating on these unlicensed spectrums, such as WiFi. The principle of fairness is that the influence of NR-U on systems that have been deployed on the unlicensed spectrum (such as WiFi) cannot exceed the influence between these systems.

In order to ensure fair coexistence between systems on the unlicensed spectrum, an energy detection mechanism has been agreed as a basic coexistence mechanism. The energy detection mechanism is generally a listen before talk (LBT) mechanism. The basic principle of the mechanism is that a base station or terminal (transmitting end) needs to sense for a period of time according to regulations before transmitting data on an unlicensed spectrum. If a sensing result indicates that a channel is in an idle state, the transmitting end may transmit data to a receiving end. If the sensing result indicates that the channel is in an occupied state, the transmitting end needs to back off a certain period of time according to the regulations before continuing to sense the channel, until the channel sensing result is the idle state, and then the data can be transmitted to the receiving end, where back-off is proposed to solve collisions effectively.

Usually, in order to ensure fairness, a duration of signal transmission by a communication device using an unlicensed spectrum channel in one transmission cannot exceed a maximum channel occupancy time (MCOT).

The following briefly introduces four channel access mechanisms specified in NR-U:

Mechanism 1: Immediate Transmission Mechanism

Specifically, the immediate transmission mechanism, refers to that, a transmitting end may immediately transmit after a switching gap in the channel occupation time COT. The switching gap refers to a switching time after reception of transmission. Usually, the switching time is sufficient short, a typical value of which does not exceed 16 us.

Mechanism 2: LBT Mechanism without Random Back-Off

Optionally, the mechanism means that the time for the transmitting end to sense the channel is deterministic, which is short generally, such as 25 us.

Mechanism 3: LBT Mechanism with Random Back-Off (with a Contention Window of Fixed Size)

In the LBT process, the transmitting end randomly selects a random value in the contention window to determine the time for sensing the channel.

Mechanism 4: LBT Mechanism with Random Back-Off (with a Contention Window of Non-Fixed Size)

In the LBT process, the transmitting end randomly selects a random value in the contention window to determine the time for sensing the channel, and the contention window is variable.

It is worth noting that channel access priority is introduced in the mechanism 4. Optionally, Table 1 shows parameter values corresponding to the channel access priority. Referring to Table 1 for details.

| Channel access priority (p) | $m_p$ | $CW_{min,p}$ | $CW_{max,p}$ | $T_{mcot,p}$ (ms) | Value of $CW_p$ |
|---|---|---|---|---|---|
| 1 | 1 | 3 | 7 | 2 | {3, 7} |
| 2 | 1 | 7 | 15 | 3 | {7, 15} |
| 3 | 3 | 15 | 63 | 8 or 10 | {15, 31, 63} |
| 4 | 7 | 15 | 1023 | 8 or 10 | {15, 31, 63, 127, 255, 511, 1023} |

Illustratively, referring to Table 1, channel access priority may be divided into 4 levels, and parameters corresponding to the priority of each level include $m_p$、$CW_{min,p}$、$CW_{max,p}$、$T_{mcot,p}$、$CW_p$.

Where, $m_p$ is a random number, which determines the channel sensing time for channel access. Specifically, the transmitting end needs to perform channel sensing for time Td before transmitting data, where the channel sensing time Td=16 μs+$m_p$×9 μs, and 9 μs is a duration of each sensing.

$CW_p$ is a random number, and is a variable representing the number of times of channel sensing. Specifically, after the transmitting end determines that the channel is in an idle state after sensing for time Td, it further needs to sense the channel N times, and the duration of each time is 9 us, where N is a random number ranging from 0 to $CW_p$, and $CW_{min,p} \leq CW_p \leq CW_{max,p}$. Therefore, $CW_{min,p}$ and $CW_{max,p}$ are related to the channel sensing time in the channel access procedure, where $CW_{min,p}$ represents a minimum number of times of channel sensing in the channel access procedure, and $CW_{max,p}$ represents a maximum number of times of channel sensing in the channel access procedure.

$T_{mcot,p}$ is the maximum time in which the transmitting end occupies a channel after it preempts the channel, and is related to the channel priority used by the transmitting end. For example, if the priority is 1, the channel will be occupied at most 2 ms after the channel is sensed successfully.

Illustratively, for a terminal device, the network device needs to transmit data to the terminal device within the time $T_{mcot,p}$, and if the network device fails to preempt the channel, which means, outside the time $T_{mcot,p}$, the terminal device will not receive the scheduled data sent by the network device.

It should be understood that the method for the network device to obtain the channel occupancy time may be a channel access method of load based equipment (LBE), that is, the communication device may perform LBT on the unlicensed spectrum after the service arrives, and start sending a signal after LBT is successful. It may also be a channel access method of frame based equipment (FBE), that is, the communication device performs LBT on the unlicensed spectrum periodically.

In the case of the LBE-based channel access method, the network device may obtain the channel occupancy time through the mechanism 4 of LBT. The mechanism 4 of LBT may refer to that the channel assessment method of the communication device is multi-slot channel assessment with random back-off based on adjustment of contention window size. Specifically, the LBT of mechanism 4 may include different channel access priorities according to the priorities of transmission services, as shown in Table 1 above.

In the case of the FBE-based channel access method, for example, FIG. 5 is a schematic diagram of a frame structure in the FBE-based channel access method. As shown in FIG. 5, in the FBE-based channel access method, the frame structure appears periodically. A frame structure includes a fixed frame period (with a length not exceeding 200 ms), a channel occupancy time COT period (with a length not exceeding 95% of the fixed frame period), an idle period (with a length of at least 5% of the channel occupancy time, the minimum value of 100 us, and located at the end of the fixed frame period).

In practical applications, as shown in FIG. 5, the communication device performs clear channel assessment (CCA) on the channel in the idle period, for example, before the start of the COT period. If the channel assessment is successful, the channel occupancy time COT in the next fixed frame period may be used for signal transmission; if the channel assessment is failed, the channel occupancy time COT in the next fixed frame period cannot be used for signal transmission. That is, in this implementation, the channel resource occasions that the communication device may use for service transmission appear periodically.

However, although the above energy detection mechanism (LBT) can ensure fair coexistence between systems on the unlicensed spectrum, when the communication system is under high load, the service quality of each system cannot be guaranteed, and there is a problem of low communication performance.

In view of the above problem, the embodiments of the present application provide an information transmission method. In NR-V2X, a terminal device performs channel sensing on a sidelink to determine whether the sidelink is available in a preset time period, determines an available resource set of the sidelink in the preset time period when the sidelink is available in the preset time period, and sends data information in the preset time period by occupying a target resource in the available resource set. In this technical solution, the available resource set of the channel in the preset time period is determined when the channel is idle, and the data information is sent on the target resource in the available resource set, so that the service quality of each system does not interfere with each other, and system stability is improved.

The information transmission method provided in the embodiments of the present application may be used in the 3rd generation mobile communication (3G) system, a long term evolution (LTE) system, the 4th generation mobile communication (4G) system, an advanced long term evolution (LTE-A) system, a cellular system related to the 3rd generation partnership project (3GPP), and the 5th generation mobile communication (5G) system and a subsequent evolved communication system.

The information transmission method provided in the embodiments of the present application may be used in a vehicle to everything system, and may also be used in any D2D system.

The network device involved in the embodiments of the present application may be a common base station (such as a NodeB or eNB or gNB), a new radio controller (NR controller), a centralized unit, a new radio base station, a remote radio module, a micro base station, a relay, a distributed unit, a transmission reception point (TRP), a transmission point (TP) or any other device, but the embodiments of the present application are not limited to these.

The terminal device involved in the embodiments of the present application, such as the first terminal device or the second terminal device, is a terminal device with V2X communication capability, and is a device that provides a user with voice and/or data connectivity, for example, a handheld device, an on-board device, a road side unit with wireless connection function, etc. Common terminal devices include: a mobile phone, a tablet computer, a notebook computer, a palmtop computer, a mobile internet device (MID), a wearable device (such as, a smart watch, a smart bracelet, a pedometer).

The technical solution of the present application will be described in the following in detail through specific embodiments. It should be noted that the following specific embodiments may be combined with each other, and the same or similar concepts or processes may not be repeated in some embodiments.

FIG. 6 is a schematic flowchart of a first embodiment of an information transmission method provided by an embodiment of the present application. The executive entity of the method is a terminal device. Referring to FIG. 6, in the embodiment, the method may include the following steps.

Step 61: perform channel sensing on a sidelink to determine whether the sidelink is available in a preset time period.

In an NR-U system, in order to ensure the fair coexistence of the communication devices on the unlicensed spectrum, before the terminal device uses the sidelink of the unlicensed spectrum to transmit information, the terminal device first performs channel sensing on the sidelink according to regulations to determine whether the sidelink is in an idle state, and then determines whether the sidelink is available in the preset time period.

Illustratively, if the terminal device does not detect any other devices sending and receiving data on the sidelink within a given period of time, it determines that the sidelink is in the idle state in the given time period, or it may also consider that the sidelink is also in the idle state in the preset time period after the current moment, and therefore, the terminal device may use the sidelink in the preset time period. If the terminal device detects other devices sending and receiving data on the sidelink within a given period of time, it will randomly back off a period of time and retry the process again, which can avoid conflicts on the wireless channel effectively.

Illustratively, in the embodiment, the step 61 may be implemented in the following feasible ways.

A1: perform channel sensing on the sidelink to determine whether the sidelink is in the idle state.

Illustratively, in a communication system, a period of time may be pre-defined for each communication device to perform channel sensing. Therefore, in the embodiment, before transmitting information on the sidelink, the terminal device may perform channel sensing in the defined time period to determine whether the sidelink is in the idle state, and determine whether the sidelink is available in the preset time period by using the sensing result.

Optionally, in the embodiment, the time period for channel sensing may be referred to as a sensing window, and the preset time period may also be referred to as a selection window. That is, whether the sidelink is available in the selection window is determined according to the sensing result in the sensing window.

For example, FIG. 7 is a schematic diagram of distribution of a sensing window and a preset time period corresponding to a sidelink. As shown in FIG. 7, the terminal device may perform channel sensing in the sensing window and select a resource on the sidelink in the preset time period according to the sensing result in the sensing window.

Optionally, in FIG. 7, for example, when the duration of the sensing window is 1 s, the sensing window is [n−1000, n], and the preset time period, i.e., the selection window, is for example, [n+T1, n+T2], where T1<=4; 20<=T2<=100.

It is worth noting that the embodiments of the present application do not limit the specific duration of the sensing window and the preset time period, which can be determined according to situations, and will not be detailed here.

A2: determine the sidelink is available in the preset time period when the sidelink is in the idle state.

In the embodiment, when determining that the sidelink is in the idle state by channel sensing, the terminal device may consider that the sidelink is also in the idle state in the preset time period, and at this time, may determine that the sidelink is available in the preset time period.

Illustratively, as shown in FIG. 7, if the time period for channel sensing is referred to as the sensing window, then when data needs to be transmitted at the end of the sensing window, data transmission may be performed by using the sidelink in a certain time period within the preset time period.

Illustratively, if the method for the terminal device to obtain the channel occupancy time is the FBE-based channel access method, it can be known according to the introduction of the frame structure in FIG. 5 above that, a frame structure includes a fixed frame period (with a length not exceeding 200 ms), a channel occupancy time period (with a length not exceeding 95% of the fixed frame period), an idle period (with a length of at least 5% of the channel occupancy time, the minimum value of 100 us, and located at the end of the fixed frame period).

As an example, the terminal device performs clear channel assessment (CCA) on a channel during an idle period of a fixed frame period to determine whether a signal may be transmitted in the COT period of the next fixed frame period.

Specifically, the step 61 may also be implemented in the following feasible way:

performing channel sensing in an idle period of a first fixed frame period to determine whether the sidelink is in the idle state; and determining the sidelink is available in a channel occupancy time period of a second fixed frame period when the sidelink is in the idle state, where the first fixed frame period and the second fixed frame period are two adjacent fixed frame periods.

For example, in the embodiment of the present application, the sensing window may be the idle period of the first fixed frame period, the preset time period is the channel occupancy time period of the second fixed frame period, and the first fixed frame period and the second fixed frame period are two fixed frame periods adjacent in time. In the embodiment, the total duration of the sensing window and the preset time period is equal to the duration of one fixed frame period.

As another example, the terminal device may also perform channel sensing and sidelink signal detection in turn in the idle time of a fixed frame period, and in the embodiment, the sequence of the channel sensing and the sidelink signal detection is not limited, which can be determined according to actual situations.

It can be understood that in another possible design of the present application, the terminal device may also perform sidelink signal detection in all or part of the channel occupancy time period of the first fixed frame period to determine whether the sidelink has a reserved resource in the channel occupancy time period of the second fixed frame period, and perform channel sensing in the idle period of the first fixed frame period to determine whether the sidelink is available in the channel occupancy time period of the second fixed frame period. It is worth noting that the embodiments of the present application do not limit the time periods occupied by the channel sensing and the sidelink signal detection, which can be determined according to actual situations, and will not be detailed here.

Therefore, in this possible design, the sensing window is the time period of the first fixed frame period (including the channel occupancy time period and the idle period), and the preset time period is the channel occupancy time period of the second fixed frame period. And the first fixed frame period and the second fixed frame period are two fixed frame periods adjacent in time. At this time, the total duration of the sensing window and the preset time period is greater than the duration of one fixed frame period.

Step 62: determine an available resource set of the sidelink in the preset time period when the sidelink is available in the preset time period.

In the embodiment, the terminal device determines that the sidelink is available in the preset time period by channel sensing, which is a conclusion estimated based on the sensing result, and information on available resources of the sidelink in the preset time period may also needs to be determined based on actual situations.

For example, if the terminal device determines that there is no sensing result on some subframes when performing channel sensing on the sidelink, it is indicated that resources on these subframes may be used for other purposes, and may also be unavailable in the preset time period. Therefore, the available resource set of the sidelink in the preset time period should not include the resources associated with these subframes.

For another example, when the terminal device determines that the sidelink is available in the preset time period by performing channel sensing, it may also detect whether there is a sidelink signal to determine a resource of the sidelink reserved in the preset time period. Therefore, the available resource set of the sidelink in the preset time period should not include the resource reserved in the preset time period.

It is worth noting that the sensing window may include a sub-time period for channel sensing and a sub-time period for signal detection. That is, the terminal device performs channel sensing in the sub-time period for channel sensing of the sensing window to determine whether the sidelink is idle, and may also preform signal detection in the sub-time period for signal detection of the sensing window to determine whether there is a sidelink signal on the sidelink, so as to determine the resource of the sidelink reserved in the preset time period.

Illustratively, in the embodiment, step 62 may be implemented in the following feasible way.

B1: detect whether there is a sidelink signal on the sidelink when the sidelink is available in the preset time period, where the sidelink signal is used to indicate a resource of the sidelink reserved in the preset time period.

In the vehicle to everything system, a signal transmitted between terminal devices is called a sidelink signal, and the sidelink signal may be used to indicate a resource of the sidelink reserved in the preset time period. Therefore, in the embodiment, when the terminal device determines that the sidelink is available in the preset time period, it may also detect whether there is a sidelink signal on the sidelink, and determine whether the sidelink has a reserved resource in the preset time period based on the detected sidelink signal.

It is worth noting that when the terminal device determines that the sidelink is busy by channel sensing, it may also detect whether there is a sidelink signal on the sidelink. If the sidelink signal is not detected, it is considered that a different system occupies channel resources.

B2: when there is a sidelink signal on the sidelink, determine an available resource set according to the sidelink signal, where the available resource set includes a resource of the sidelink which is not reserved in the preset time period.

In the embodiment, if the terminal device detects the sidelink signal, the terminal device may process the sidelink signal to determine resources of the sidelink that may be used or reserved by other terminals in the preset time period. Therefore, in the embodiment, the terminal device may determine the resource of the sidelink which is not reserved in the preset time period, i.e., the available resource set, based on the resources reserved by other devices in the preset time period as indicated by the sidelink signal.

Step 63: send data information in the preset time period by occupying a target resource in the available resource set.

In the embodiment, when the terminal device determines the available resource set of the sidelink in the preset time period, it may directly occupy the target resource in the preset time period to send data information through the sidelink. It is also possible to first determine the target resource from the available resource set and a sub-time period during which the target resource is occupied, and then occupy the target resource in the determined period within the preset time period to send data information through the sidelink.

The information transmission method provided in the embodiments of the present application detects whether a sidelink is available in a preset time period by performing channel sensing on the sidelink, determines an available resource set of the sidelink in the preset time period when the sidelink is available in the preset time period, and finally sends data information in the preset time period by occupying a target resource in the available resource set. In this technical solution, the terminal device finally occupies the target resource to send data information in the preset time period according to the channel sensing result and the availability of the sidelink in the preset time period, so that the service quality of each system does not interfere with each other, and system stability is improved.

Figure 8:
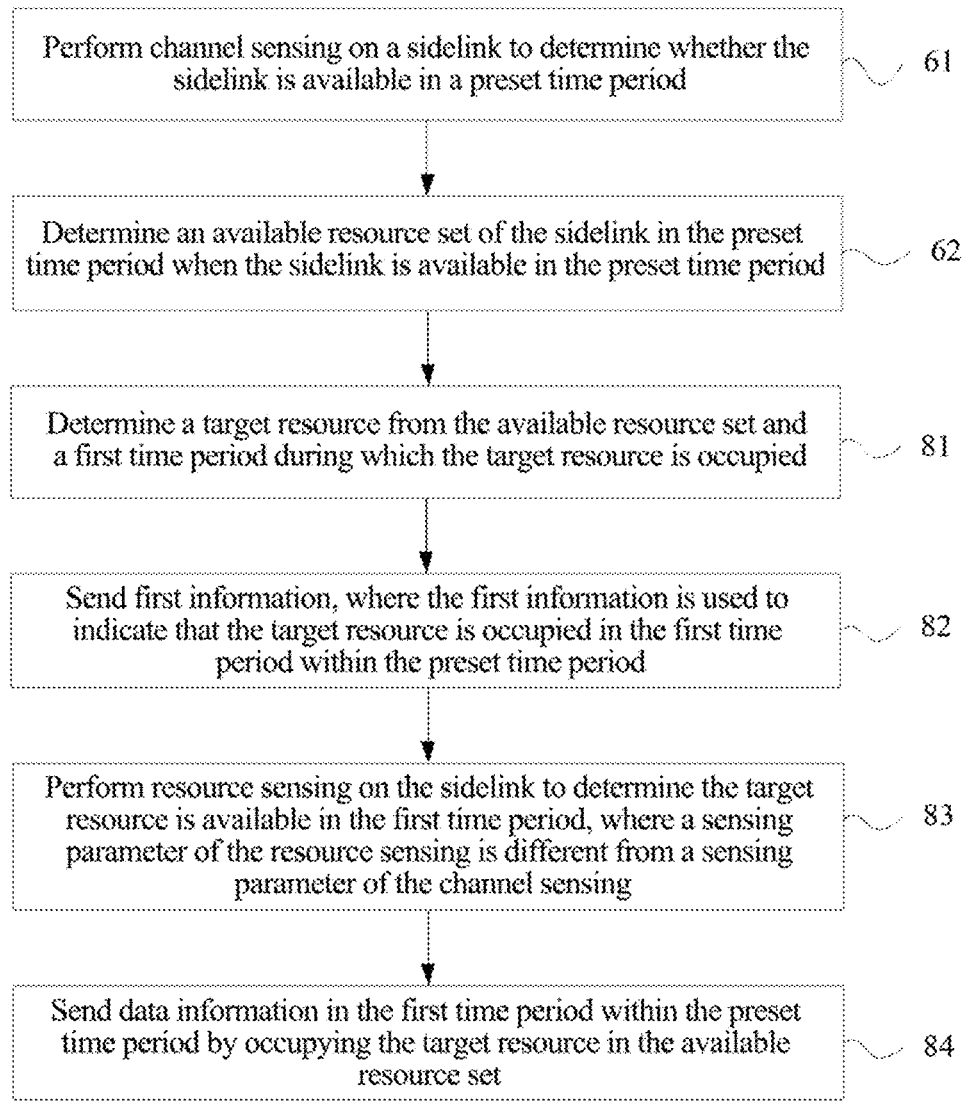
FIG. 8 is a schematic flowchart of a second embodiment of the information transmission method provided by an embodiment of the present application.

Optional, as an example, FIG. 8 is a schematic flowchart of a second embodiment of the information transmission method provided by an embodiment of the present application. As shown in FIG. 8, in the embodiment, before the step 63, the method may further include the following steps.

Step 81: determine the target resource from the available resource set and a first time period during which the target resource is occupied.

In the embodiment, before the terminal device occupies the target resource to send data information in the preset time period, it may first determine the target resource from the available resource set and the first time period during which the target resource is occupied.

Specifically, the terminal may perform sidelink received signal strength indicator (S-RSSI) detection on resources in the available resource set, and sort the resources according to signal strength from high to low, and determine the target resource to be occupied to send data information based on the sorting result and the time period during which the target resource is occupied in the preset time period, for example, the first time period.

Step 82: send first information, where the first information is used to indicate that the target resource is occupied in the first time period within the preset time period.

In the embodiment, when the terminal device needs to occupy the target resource in the first time period within the preset time period, it may send the first information before the start of the first time period to notify other devices that the terminal device will occupy the target resource in the first time period of the preset time period, thereby avoiding resource conflicts effectively. The first information sent by the terminal device may also be used to inform the receiving end of the data information that the data information needs to be received by detecting the target resource in the first time period within the preset time period.

Optionally, in the embodiments of the present application, in order to ensure the availability of the target resource of the sidelink in the first time period within the preset time period, the terminal device may also perform resource sensing before occupying the target resource to send data information in the first time period. Specifically, referring to FIG. 8, the method further includes the following step.

Step 83: perform resource sensing on the sidelink to determine that the target resource is available in the first time period, where a sensing parameter of the resource sensing is different from a sensing parameter of the channel sensing.

Optionally, in the embodiment, the implementation principle of the resource sensing is similar to the implementation principle of channel sensing in step 61, except that the sensing parameter of the resource sensing in this step is different from that of the channel sensing in step 61. For example, the duration of sensing is different, the signal strength threshold of the sensing is different. Optionally, the sensing duration of the resource sensing in this step is less than the sensing duration of the channel sensing in step 61, and the signal strength threshold of the resource sensing in this step is less than the signal strength threshold of the channel sensing in step 61.

In the embodiment, the terminal device performs resource sensing on the sidelink, and when it is determined that the sidelink is in the idle state, it may be indicated that the target resource of the sidelink is available in the first time period. Therefore, the terminal device may send data information by occupying the target resource in the first time period.

Correspondingly, the step 63 may be implemented through the following step.

Step 84: send data information in the first time period within the preset time period by occupying the target resource in the available resource set.

In the embodiment, after the terminal device performs the resource sensing on the sidelink, if it is determined that the sidelink is in the idle state, it may be indicated that the target resource of the sidelink is available in the first time period. Therefore, the terminal device may occupy the target resource to send data information in the first time period.

In the information transmission method provided by the embodiments of the present application, before the terminal device occupies the target resource in the available resource set to send data information within the preset time period, it first determines the target resource from the available resource set and the first time period during which the target resource is occupied, and sends the first information to indicate that the terminal device will occupy the target resource in the first time period, which not only avoids resource conflicts effectively, but also informs the receiving end in time, so that it monitors the target resource to receive data information at a corresponding time, thereby improving the efficiency of information reception.

Figure 9:
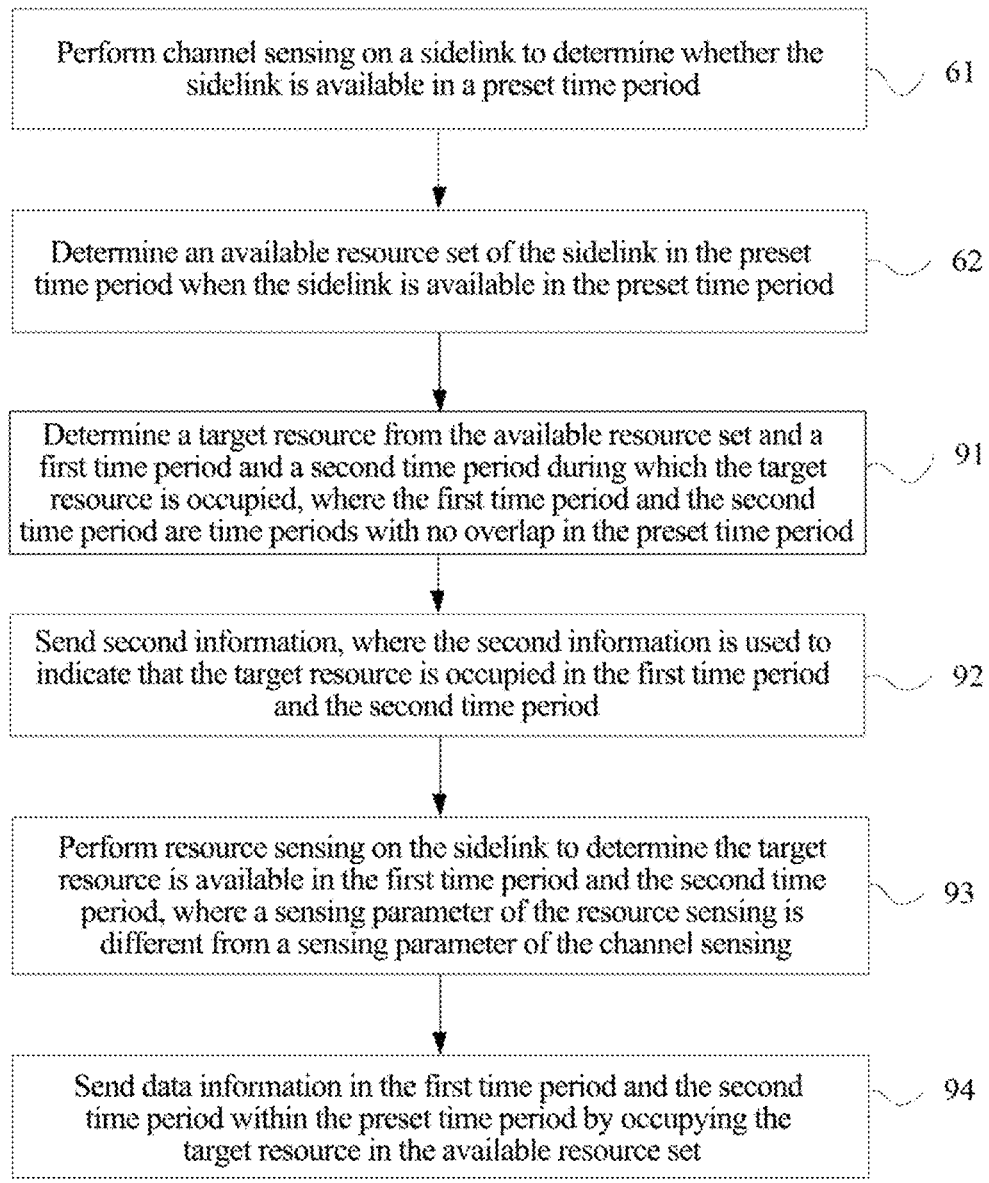
FIG. 9 is a schematic flowchart of a third embodiment of the information transmission method provided by an embodiment of the present application.

Optionally, as another example, FIG. 9 is a schematic flowchart of a third embodiment of the information transmission method provided by an embodiment of the present application. The difference between the present embodiment and the embodiment shown in FIG. 8 is that the terminal device in the embodiment shown in FIG. 8 only occupies the target resource in a first time period of the preset time period, while the terminal device in the present embodiment occupies the target resource in a first time period and a second time period within the preset time period.

Specifically, as shown in FIG. 9, in the embodiment, before the step 63, the method may further include the following steps.

Step 91: determine the target resource from the available resource set and a first time period and a second time period during which the target resource is occupied, where the first time period and the second time period are time periods with no overlap in the preset time period.

In the embodiment, before the terminal device occupies the target resource to send data information in the preset time period, it may determine the target resource from the available resource set and the first time period and the second time period during which the target resource is occupied.

The first time period and the second time period are two sub-time periods in the preset time period that have no overlap. That is, the terminal device may occupy the target resource to send data information in multiple different sub-time periods within the preset time period.

It is worth noting that the embodiments of the present application do not limit the number of time periods and specific time periods for occupying the target resource, that is, the terminal device may also occupy the target resource in other time periods than the first time period and the second time period. The specific number of time periods and the specific duration of the time periods for occupying the target resource may be determined according to actual situations, which will not be detailed here.

In the embodiment, reference can be made to the description in step 81 shown in FIG. 8 for the specific implementation of determining the target resource, which will not be repeated here.

Step 92: send second information, where the second information is used to indicate that the target resource is occupied in the first time period and the second time period.

In the embodiment, when the terminal device needs to occupy the target resource in the first time period and the second time period within the preset time period, it may send the second information in a time period before the start of the first time period and the second time period to notify other devices that the terminal device will occupy the target resource in the first time period and the second time period of the preset time period, thereby avoiding resource conflicts effectively. The second information sent by the terminal device may also be used to inform the receiving end of the data information that the data information needs to be received by detecting the target resource in the first time period and the second time period within the preset time period.

That is, in the embodiment, the terminal device sends indication of occupying the target resource in the first time period and the second time period to other devices through one piece of indication information.

It may be understood that when the terminal device occupies the target resource in multiple time periods within the preset time period, it may also send indication of occupying the target resource in these multiple time periods to other devices through one piece of indication information.

Step 93: perform resource sensing on the sidelink to determine the target resource is available in the first time period and the second time period, where a sensing parameter of the resource sensing is different from a sensing parameter of the channel sensing.

Optionally, in the embodiment, if the terminal device needs to occupy the target resource to send data information in the first time period and the second time period, then, in order to ensure that the target resource of the sidelink is available in the first time period and the second time period, the terminal device also needs to perform resource sensing before sending data information.

Similarly, in the embodiment, the implementation principle of the resource sensing is similar to the implementation principle of channel sensing in step 61. The difference is that the sensing parameter of the resource sensing in this step is different from the sensing parameter of the channel sensing in step 61.

Optionally, the sensing parameter of the resource sensing in the embodiment may be the same as or different from the parameter of the resource sensing in the step 83. The specific value of the sensing parameter may be determined according to actual situations, which will not be detailed here.

Correspondingly, the step 63 may be implemented through the following step.

Step 94: send data information in the first time period and the second time period within the preset time period by occupying the target resource in the available resource set.

In the embodiment, after the terminal device performs the resource sensing on the sidelink, if it is determined that the sidelink is the idle state, it may be indicated that the target resource of the sidelink is available in both the first time period and the second time period. Therefore, the terminal device may occupy the target resource to send data information in the first time period and the second time period.

In the information transmission method provided by the embodiment of the present application, the terminal device determines the target resource from the available resource set and the first time period and the second time period during which the target resource is occupied before occupying the target resource in the available resource set to send data information in the preset time period, where the first time period and the second time period are time periods with no overlap in the preset time period; sends the second information, where the second information is used to indicate that the target resource is occupied in the first time period and the second time period; performs resource sensing on the sidelink, and determines that the target resource is available in the first time period and the second time period, where the sensing parameter of the resource sensing is different from the sensing parameter of the channel sensing; and sends data information in the first time period and the second time period within the preset time period by occupying the target resource in the available resource set. In this technical solution, the terminal device sends the indication of occupying the target resource in the first time period and the second time period through the second information, which saves signaling overhead and reduces resource utilization.

Figure 10:
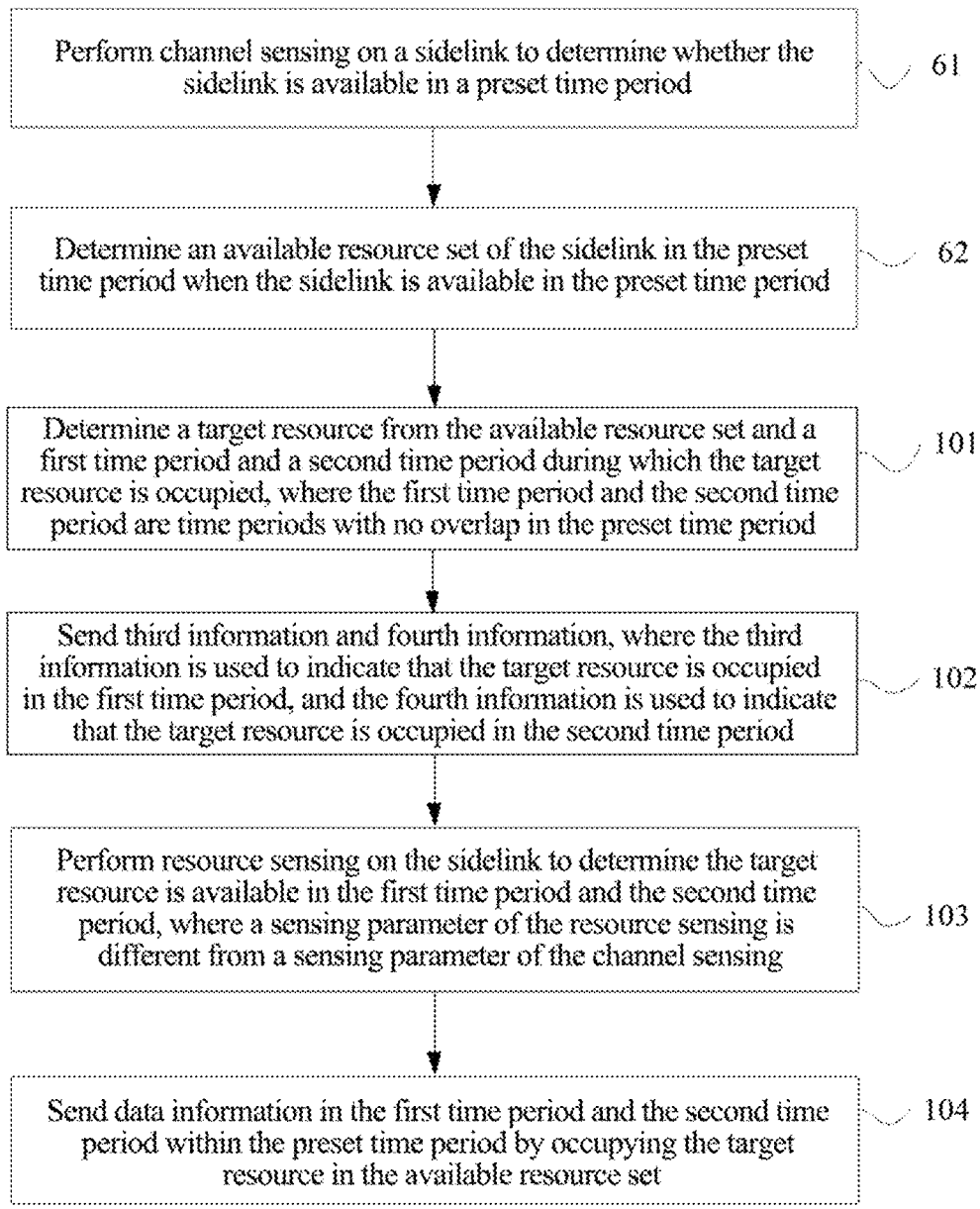
FIG. 10 is a schematic flowchart of a fourth embodiment of the information transmission method provided by an embodiment of the present application.

Optionally, as another example, FIG. 10 is a schematic flowchart of a fourth embodiment of the information transmission method provided by an embodiment of the present application. The difference between the present embodiment and the embodiment shown in FIG. 9 is that the terminal device in the embodiment shown in FIG. 9 sends the indication of occupying the target resource in the first time period and the second time period within the preset time period through one piece of instruction information, while the terminal device in the present embodiment sends the indication of occupying the target resource in the first time period and the second time period in the preset time period through two pieces of instruction information, respectively.

Specifically, as shown in FIG. 10, in this embodiment, before the step 63, the method may further include the following steps:

Step 101: determine the target resource from the available resource set and a first time period and a second time period during which the target resource is occupied, where the first time period and the second time period are time periods with no overlap in the preset time period.

Step 102: send third information and fourth information, where the third information is used to indicate that the target resource is occupied in the first time period, and the fourth information is used to indicate that the target resource is occupied in the second time period.

Optionally, in the embodiment, when the terminal device needs to occupy the target resource in the first time period and the second time period within the preset time period, it may send the third information before the start of the first time period and send the fourth information before the start of the second time period to notify other devices that the terminal device will occupy the target resource in the first time period and the second time period of the preset time period, which will avoid the resource conflicts and inform the receiving end of the data information that the data information needs to be received by detecting the target resource in the first time period and the second time period within the preset time period.

That is, in this embodiment, the terminal device sends the indication of occupying the target resource in the first time period and the second time period to other devices through two pieces of indication information.

It can be understood that when the terminal device occupies the target resource in multiple time periods within the preset time period, it may send indication of occupying the target resource in these multiple time periods to other devices through multiple pieces of instruction information, respectively.

It is worth noting that if the first time period is earlier than the second time period in time, the time period in which the fourth information is sent may also be the first time period, that is, before occupying the target resource to send the data information in the first time period, the terminal device first integrates the fourth information and the data information to be sent in the first time period into a message and send the message to indicate that the terminal device will occupy the target resource in the second time period of the preset time period.

The embodiment of the present application does not limit the sending mode and the sending time period of the fourth information, as long as it is sent before the second time period starts.

Step 103: perform resource sensing on the sidelink to determine the target resource is available in the first time period and the second time period, where a sensing parameter of the resource sensing is different from a sensing parameter of the channel sensing.

Correspondingly, the step 63 may be implemented through the following step:

Step 104: send data information in the first time period and the second time period within the preset time period by occupying the target resource in the available resource set.

The implementation principles of step 101, step 103, and step 104 are the same as those of step 91, step 93, and step 94 in the embodiment shown in FIG. 9 respectively. Please refer to the description in the embodiments above for details, which will not be repeated here.

In the information transmission method provided by the embodiments of the present application, the terminal device determines the target resource from the available resource set and the first time period and the second time period during which the target resource is occupied before occupying the target resource in the available resource set to send data information in the preset time period, where the first time period and the second time period are time periods with no overlap in the preset time period; and sends the third information and the fourth information, where the third information is used to indicate the target resource is occupied in the first time period, and the fourth information is used to indicate that the target resource is occupied in the second time period; in addition, it may also perform the resource sensing on the sidelink, determine that the target resource is available in the second time period, and send data information in the first time period and the second time period within the preset time period by occupying the target resource in the available resource set. In this technical solution, the terminal device sends the indication of occupying the target resource in the first time period and the second time period through two pieces of information respectively, and sends the information after the resource sensing, which improves the probability of resource availability and further improves the system stability.

Figure 11:
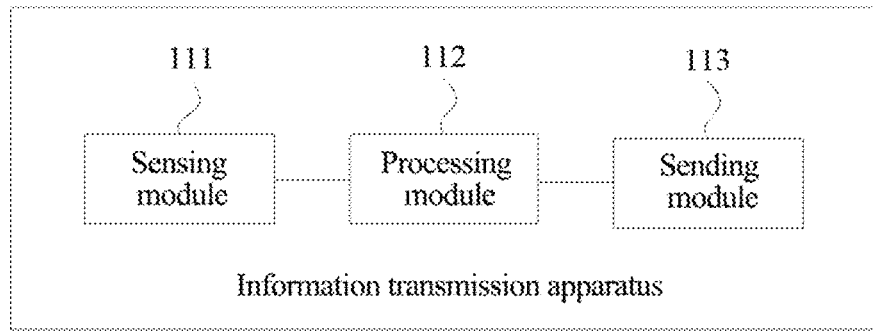
FIG. 11 is a schematic structural diagram of an embodiment of an information transmission apparatus provided by an embodiment of the present application.

FIG. 11 is a schematic structural diagram of an embodiment of an information transmission apparatus provided by an embodiment of the present application. The apparatus may be integrated in a terminal device, or may be implemented by a terminal device. As shown in FIG. 11, the apparatus may include: a sensing module 111, a processing module 112, and a sending module 113.

The sensing module 111 is configured to perform channel sensing on a sidelink to determine whether the sidelink is available in a preset time period;

the processing module 112 is configured to determine an available resource set of the sidelink in the preset time period when the sidelink is available in the preset time period;

the sending module 113 is configured to send data information in the preset time period by occupying a target resource in the available resource set.

In a possible design of the embodiment of the present application, the sensing module 111 is specifically configured to perform channel sensing on the sidelink to determine whether the sidelink is in an idle state, and determine the sidelink is available in the preset time period when the sidelink is in the idle state.

Optionally, the sensing module is specifically configured to perform channel sensing during an idle period of a first fixed frame period to determine whether the sidelink is in the idle state; and determine the sidelink is available in a channel occupancy time period of a second fixed frame period when the sidelink is in the idle state, where the first fixed frame period and the second fixed frame period are two adjacent fixed frame periods.

In another possible design of the embodiment of the present application, the processing module 112 is specifically configured to detect whether there is a sidelink signal on the sidelink when the sidelink is available in the preset time period, where the sidelink signal is used to indicate a resource of the sidelink reserved in the preset time period; when there is the sidelink signal on the sidelink, determine the available resource set according to the sidelink signal, where the available resource set includes a resource of the sidelink not reserved in the preset time period.

In still another possible design of the embodiment of the present application, the processing module 112 is further configured to determine the target resource from the available resource set and a first time period during which the target resource is occupied, before the sending module 113 sends the data information in the preset time period by occupying the target resource in the available resource set;

the sending module 113 is further configured to send first information, where the first information is used to indicate that the target resource is occupied in the first time period within the preset time period; and the sending module 113 is specifically configured to send the data information in the first time period within the preset time period by occupying the target resource in the available resource set.

In the possible design of the embodiment, the sensing module 111 is further configured to perform resource sensing on the sidelink to determine the target resource is available in the first time period, before the sending module 113 sends the data information in the first time period within the preset time period by occupying the target resource in the available resource set, where a sensing parameter of the resource sensing is different from a sensing parameter of the channel sensing.

In still another possible design of the embodiment of the present application, the processing module 112 is further configured to determine the target resource from the available resource set and a first time period and a second time period during which the target resource is occupied, before the sending module 113 sends the data information in the preset time period by occupying the target resource in the available resource set, where the first time period and the second time period are time periods with no overlap in the preset time period;

the sending module 113 is further configured to send second information, where the second information is used to indicate that the target resource is occupied in the first time period and the second time period.

In still another possible design of the embodiment of the present application, the processing module 112 is further configured to determine the target resource from the available resource set and a first time period and a second time period during which the target resource is occupied, before the sending module 113 sends data information in the preset time period by occupying the target resource in the available resource set, where the first time period and the second time period are time periods with no overlap in the preset time period;

the sending module 113 is further configured to send third information and fourth information, where the third information is used to indicate the target resource is occupied in the first time period, and the fourth information is used to indicate that the target resource is occupied in the second time period.

Optionally, in the possible design of the embodiment of the present application, the sending module 113 is specifically configured to send the data information in the first time period and the second time period within the preset time period by occupying the target resource in the available resource set.

Optionally, the sensing module 111 is further configured to perform resource sensing on the sidelink to determine that the target resource is available in the first time period and the second time period, before the sending module 113 sends the data information in the first time period and the second time period within the preset time period by occupying the target resource in the available resource set, where a sensing parameter of the resource sensing is different from a sensing parameter of the channel sensing.

The apparatus provided in the embodiment is configured to implement the technical solutions in the embodiments shown in FIG. 6, FIG. 8 to FIG. 10, the implementation principles and technical effects are similar. The terminal device performs channel sensing on a sidelink to determine whether the sidelink is available in a preset time period, determines an available resource set of the sidelink in the preset time period when the sidelink is available in the preset time period, and sends data information in the preset time period by occupying a target resource in the available resource set. In this technical solution, the available resource set of the channel in the preset time period is determined when the channel is idle, and the data information is sent on the target resource in the available resource set, so that the service quality of each system does not interfere with each other, and system stability is improved.

It should be noted that the division of respective modules of the above apparatus is only a division of logical functions, which may be fully or partially integrated into a physical entity in actual implementation, or may be physically separated. And these modules may all be implemented in the form of software called by a processing element; these modules may also be implemented in the form of hardware. It is also possible that part of the modules is implemented in the form of software called by a processing element, and part of the modules is implemented in the form of hardware. For example, the processing module may be a separate processing element, or it may be integrated in a chip of the apparatus for implementation; in addition, it may also be stored in a memory of the apparatus in the form of program code, which is called by a certain processing element of the apparatus to execute the function of the above-mentioned processing module. The implementation of other modules is similar. In addition, all or part of these modules may be integrated together or implemented independently. The processing element described here may be an integrated circuit with signal processing capability. In the implementation process, each step of the above method or each of the above modules may be completed by the integrated logic circuit of hardware in the processor element or instructions in the form of software. For example, the above modules may be one or more integrated circuits configured to implement the above method, such as one or more application specific integrated circuits (ASIC), or one or more digital signal processors (DSP), or, one or more field programmable gate arrays (FPGA), etc. For another example, when one of the above modules is implemented with the program code scheduled by a processing element, the processing element may be a general-purpose processor, such as a central processing unit (CPU) or other processors that can call program code. For another example, these modules may be integrated together and implemented in the form of system-on-a-chip (SOC).

The above embodiments may be implemented in whole or in part by software, hardware, firmware, or any combination thereof. When the embodiments are implemented by software, it may be implemented in the form of a computer program product in whole or in part. The computer program product includes one or more computer instructions. When the computer program instructions are loaded and executed on a computer, the processes or functions described in the embodiments of the present application are generated in whole or in part. The computer may be a general-purpose computer, a special-purpose computer, a computer network, or other programmable devices. The computer instructions may be stored in a computer-readable storage medium, or transmitted from a computer-readable storage medium to another computer-readable storage medium. For example, the computer instructions may be transmitted from a website, a computer, a server, or a data center to another website site, computer, server or data center in a wired (for example, coaxial cable, optical fiber, digital subscriber line (DSL)) or wireless (for example, infrared, wireless, microwave, etc.) manner. The computer-readable storage medium may be any available medium that may be accessed by a computer, or data storage device such as server or data center, integrated with one or more available media. The available medium may be a magnetic medium (for example, a floppy disk, a hard disk, and a magnetic tape), an optical medium (for example, a DVD), or a semiconductor medium (for example, a solid state disk (SSD)).

Figure 12:
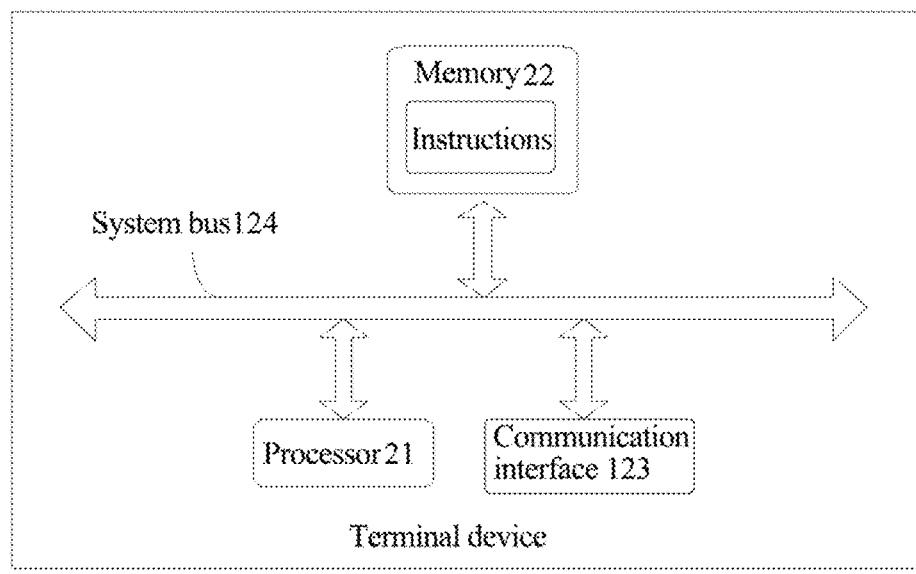
FIG. 12 is a schematic structural diagram of an embodiment of a terminal device provided by an embodiment of the present application.

FIG. 12 is a schematic structural diagram of an embodiment of a terminal device provided by an embodiment of the present application. As shown in FIG. 12, the terminal device may include: a processor 121, a memory 122, a communication interface 123, and a system bus 124. The memory 122 and the communication interface 123 are connected to the processor 121 via the system bus 124 and communicate with each other. The memory 122 is configured to store computer-executable instructions, the communication interface 123 is configured to communicate with other devices, and the processor 121 executes the computer-executable instructions, so that when the processor 121 executes the computer-executable instructions, the solutions of the method embodiments shown in FIG. 6, FIG. 8 to FIG. 10 are implemented.

The system bus mentioned in FIG. 12 may be a peripheral component interconnect (PCI) bus or an extended industry standard architecture (EISA) bus, etc. The system bus may be divided into an address bus, a data bus, a control bus, etc. For ease of representation, only one thick line is used in the figure for representation, but it does not mean that there is only one bus or one type of bus. The communication interface is used to implement the communication between the terminal device and other devices. The memory may include a random access memory (RAM), and may also include a non-volatile memory, for example, at least one disk memory.

The processor may be a general-purpose processor, including a central processing unit (CPU), a network processor (NP), etc.; it may also be a digital signal processor (DSP), an application-specific integrated circuit (ASIC), a field programmable gate array (FPGA) or other programming logic device, discrete gate or transistor logic device, discrete hardware component.

Figure 13:
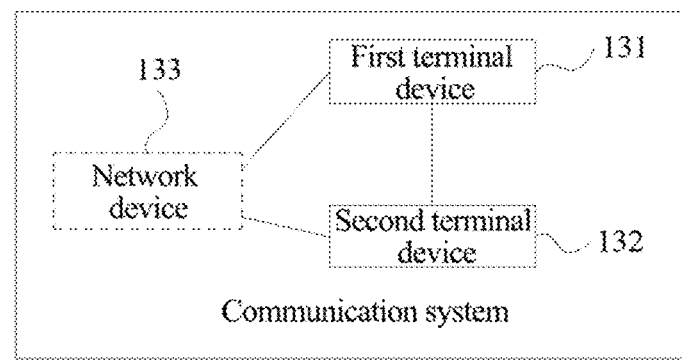
FIG. 13 is a schematic structural diagram of an embodiment of a communication system provided by an embodiment of the present application.

FIG. 13 is a schematic structural diagram of an embodiment of a communication system provided by an embodiment of the present application. As shown in FIG. 13, the communication system may include: a first terminal device 131 and a second terminal device 132.

The first terminal device 131 may be the information transmission apparatus in the embodiment shown in FIG. 10 or the terminal device in the embodiment shown in FIG. 11, and the first terminal device 131 and the second terminal device 132 can communicate with each other.

It is worth noting that, in another embodiment of the present application, the second terminal device 132 may execute the technical solution of the first terminal device 131 described above.

Illustratively, the communication system may be referred to as a vehicle to everything system or a D2D system.

Optionally, the communication system of the present application may further include: a network device 133. The network device 133 may provide services for the first terminal device 131 and/or the second terminal device 131.

In the embodiment, for the specific implementation of the first terminal device 131, reference can be made to the description in the above embodiments, which will not be repeated here.

Optionally, an embodiment of the present application provides a computer-readable storage medium which has instructions stored therein, and the instructions when running on a computer, cause the computer to execute the implementation solutions of the method embodiment shown in FIG. 6, FIG. 8 to FIG. 10.

Optionally, an embodiment of the present application further provides a chip for running instructions, including: a processing module and a communication interface, and the processing module can execute the implementation solutions of the method embodiments shown in FIG. 6, FIG. 8 to FIG. 10.

Further, the chip also includes a storage module (such as a memory), the storage module is used to store instructions, the processing module is configured to execute the instructions stored in the storage module, and the execution of the instructions stored in the storage module causes the processing module to perform the technical solutions of the method embodiments.

An embodiment of the present application further provides a program, and the program, when executed by a processor, is used to execute the implementation solutions of the method embodiments shown in FIG. 6, FIG. 8 to FIG. 10.

An embodiment of the present application further provides a program product, the program product includes a computer program, the computer program is stored in a storage medium, at least one processor can read the computer program from the storage medium, and when the at least one processor executes the computer program, the implementation solutions of the method embodiments shown in FIG. 6, FIG. 8 to FIG. 10 can be implemented.

In the present application, "at least one" refers to one or more, and "multiple" refers to two or more. "And/or" describes the association relationship of associated objects, indicates that there may be three relationships, for example, A and/or B, which means A exists alone, A and B both exist, and B exists alone, where A, B can be singular or plural. The character "/" generally indicates that the associated objects before and after are in an "or" relationship; in a formula, the character "/" indicates that the associated objects before and after are in a "division" relationship. "At least one of the followings" or similar expression refers to any combination of these items, including any combination of a single item or multiple items. For example, at least one of a, b, or c may indicate a, b, c, ab, ac, bc, or abc, where a, b, and c can be single or multiple. It can be understood that the various numerical numbers involved in the embodiments of the present application are only for easy distinction in description, and are not used to limit the scope of the embodiments of the present application.

It can be understood that, in the embodiments of the present application, the size of the sequence numbers of the foregoing processes does not mean the order of execution and should not constitute any limitation to the implementation process of the embodiments of the present application. The execution order of each process should be determined by its function and internal logic.

What is claimed is:

1. An information transmission method, applied to a terminal device, comprising:
   performing channel sensing on a sidelink to determine whether the sidelink is available in a preset time period;
   determining an available resource set of the sidelink in the preset time period when the sidelink is available in the preset time period;
   sending data information in the preset time period by occupying a target resource in the available resource set;
   wherein before the sending the data information in the preset time period by occupying the target resource in the available resource set, further comprises:
   determining the target resource from the available resource set and a first time period and a second time period during which the target resource is occupied, wherein the first time period and the second time period are time periods with no overlap in the preset time period; and
   sending second information, wherein the second information is used to indicate that the target resource is occupied in the first time period and the second time period; or sending third information and fourth information, wherein the third information is used to indicate that the target resource is occupied in the first time period, and the fourth information is used to indicate that the target resource is occupied in the second time period.

2. The method according to claim 1, wherein the performing the channel sensing on the sidelink to determine whether the sidelink is available in the preset time period comprises:
   performing the channel sensing on the sidelink to determine whether the sidelink is in an idle state; and
   determining the sidelink is available in the preset time period when the sidelink is in the idle state.

3. The method according to claim 2, wherein the performing the channel sensing on the sidelink to determine whether the sidelink is available in the preset time period comprises:
   performing the channel sensing during an idle period of a first fixed frame period to determine whether the sidelink is the idle state;
   determining the sidelink is available in a channel occupancy time period of a second fixed frame period when the sidelink is in the idle state, wherein the first fixed frame period and the second fixed frame period are two adjacent fixed frame periods.

4. The method according to claim 1, wherein the determining the available resource set of the sidelink in the preset time period when the sidelink is available in the preset time period comprises:
   detecting whether there is a sidelink signal on the sidelink when the sidelink is available in the preset time period, wherein the sidelink signal is used to indicate a resource of the sidelink reserved in the preset time period;

when there is the sidelink signal on the sidelink, determining the available resource set according to the sidelink signal, wherein the available resource set comprises a resource of the sidelink not reserved in the preset time period.

5. The method according to claim 1, wherein the sending the data information in the preset time period by occupying the target resource in the available resource set comprises:

sending the data information in the first time period and the second time period within the preset time period by occupying the target resource in the available resource set.

6. The method according to claim 5, wherein before the sending the data information in the first time period and the second time period within the preset time period by occupying the target resource in the available resource set, the method further comprises:

performing resource sensing on the sidelink to determine that the target resource is available in the first time period and the second time period, wherein a sensing parameter of the resource sensing is different from a sensing parameter of the channel sensing.

7. A non-transitory computer-readable storage medium, wherein the computer-readable storage medium has computer-executable instructions stored thereon, and when a processor executes the computer-executable instructions, the method according to claim 1 is implemented.

8. The non-transitory computer-readable storage medium according to claim 7, wherein the performing the channel sensing on the sidelink to determine whether the sidelink is available in the preset time period comprises:

performing the channel sensing on the sidelink to determine whether the sidelink is in an idle state; and determining the sidelink is available in the preset time period when the sidelink is in the idle state.

9. The non-transitory computer-readable storage medium according to claim 8, wherein the performing the channel sensing on the sidelink to determine whether the sidelink is available in the preset time period comprises:

performing the channel sensing during an idle period of a first fixed frame period to determine whether the sidelink is the idle state;

determining the sidelink is available in a channel occupancy time period of a second fixed frame period when the sidelink is in the idle state, wherein the first fixed frame period and the second fixed frame period are two adjacent fixed frame periods.

10. The non-transitory computer-readable storage medium according to claim 7, wherein the determining the available resource set of the sidelink in the preset time period when the sidelink is available in the preset time period comprises:

detecting whether there is a sidelink signal on the sidelink when the sidelink is available in the preset time period, wherein the sidelink signal is used to indicate a resource of the sidelink reserved in the preset time period;

when there is the sidelink signal on the sidelink, determining the available resource set according to the sidelink signal, wherein the available resource set comprises a resource of the sidelink not reserved in the preset time period.

11. The non-transitory computer-readable storage medium according to claim 7, wherein the sending the data information in the preset time period by occupying the target resource in the available resource set comprises:

sending the data information in the first time period and the second time period within the preset time period by occupying the target resource in the available resource set.

12. The non-transitory computer-readable storage medium according to claim 11, wherein before the sending the data information in the first time period and the second time period within the preset time period by occupying the target resource in the available resource set, the method further comprises:

performing resource sensing on the sidelink to determine that the target resource is available in the first time period and the second time period, wherein a sensing parameter of the resource sensing is different from a sensing parameter of the channel sensing.

13. An information transmission apparatus, applied to a terminal device, comprising:

at least one processor; and a memory communicatively connected to the at least one processor; wherein, the memory stores instructions executable by the at least one processor, and the at least one processor when executing the instructions is configured to:

perform channel sensing on a sidelink to determine whether the sidelink is available in a preset time period;

determine an available resource set of the sidelink in the preset time period when the sidelink is available in the preset time period; and send data information in the preset time period by occupying a target resource in the available resource set;

wherein the at least one processor is further configured to determine the target resource from the available resource set and a first time period during which the target resource is occupied, before sending the data information in the preset time period by occupying the target resource in the available resource set;

send first information, wherein the first information is used to indicate that the target resource is occupied in the first time period within the preset time period; and send the data information in the first time period within the preset time period by occupying the target resource in the available resource set;

wherein the at least one processor is further configured to perform resource sensing on the sidelink to determine the target resource is available in the first time period, before sending the data information in the first time period within the preset time period by occupying the target resource in the available resource set, wherein a sensing parameter of the resource sensing is different from a sensing parameter of the channel sensing.

14. The apparatus according to claim 13, wherein the at least one processor is specifically configured to perform the channel sensing on the sidelink to determine whether the sidelink is in an idle state, and determine the sidelink is available in the preset time period when the sidelink is in the idle state.

15. The apparatus according to claim 14, wherein the at least one processor is configured to perform the channel sensing during an idle period of a first fixed frame period to determine whether the sidelink is in the idle state; and determine the sidelink is available in a channel occupancy time period of a second fixed frame period when the sidelink is in the idle state, wherein the first fixed frame period and the second fixed frame period are two adjacent fixed frame periods.

16. The apparatus according to claim 13, wherein the at least one processor is configured to detect whether there is a sidelink signal on the sidelink when the sidelink is available in the preset time period, wherein the sidelink signal is used to indicate a resource of the sidelink reserved in the preset time period; and when there is the sidelink signal on the sidelink, determine the available resource set according to the sidelink signal, wherein the available resource set comprises a resource of the sidelink not reserved in the preset time period.

* * * * *